US011185975B2

(12) United States Patent
Hyun

(10) Patent No.: US 11,185,975 B2
(45) Date of Patent: Nov. 30, 2021

(54) WALKING CONTROL SYSTEM AND CONTROL METHOD OF ROBOT

(71) Applicants: Hyundai Motor Company, Seoul (KR); Kia Motors Corporation, Seoul (KR)

(72) Inventor: Dong Jin Hyun, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 265 days.

(21) Appl. No.: 16/569,100

(22) Filed: Sep. 12, 2019

(65) Prior Publication Data

US 2020/0262054 A1    Aug. 20, 2020

(30) Foreign Application Priority Data

Feb. 15, 2019  (KR) .................. 10-2019-0017531

(51) Int. Cl.
*B25J 13/00* (2006.01)
*B25J 9/00* (2006.01)
*B25J 9/16* (2006.01)
*B25J 13/08* (2006.01)

(52) U.S. Cl.
CPC .......... *B25J 9/0006* (2013.01); *B25J 9/1633* (2013.01); *B25J 9/1664* (2013.01); *B25J 13/085* (2013.01); *B25J 9/1602* (2013.01); *B25J 9/1641* (2013.01)

(58) Field of Classification Search
CPC ...... B25J 9/0006; B25J 9/1664; B25J 9/1602; B25J 9/1633; B25J 9/1641; B25J 13/085; Y10S 901/01; Y10S 901/48

USPC ................ 700/245, 261, 260, 61; 901/1, 48; 318/568.12, 568.11, 568.17
See application file for complete search history.

(56) References Cited

U.S. PATENT DOCUMENTS

| | | | | |
|---|---|---|---|---|
| 6,666,831 | B1 * | 12/2003 | Edgerton | ............. A61H 1/0237 600/587 |
| 7,331,906 | B2 * | 2/2008 | He | ....................... A61H 1/0237 482/69 |
| 10,434,352 | B2 * | 10/2019 | Campbell | ............ A63B 21/285 |
| 10,463,308 | B2 * | 11/2019 | Hou | .................... A61B 5/4519 |
| 2014/0188279 | A1 | 7/2014 | Lee et al. | |

FOREIGN PATENT DOCUMENTS

| | | |
|---|---|---|
| EP | 2 497 610 A1 | 9/2012 |
| KR | 101745110 B1 | 6/2017 |
| WO | 2018/097419 A2 | 5/2018 |

* cited by examiner

*Primary Examiner* — Dalena Tran
(74) *Attorney, Agent, or Firm* — Mintz Levin Cohn Ferris Glovsky and Popeo, P.C.; Peter F. Corless

(57) ABSTRACT

A walking control method of a robot is provided. The method includes receiving a walking command of the robot including a link device having a plurality of links that correspond to both lower limbs. In response to receiving the walking command, implementing walking of the robot by providing torque to the link device to move a first lower limb is moved. In a double stance state where foot ends of the both lower limbs are simultaneously in contact with ground while the lower limb to be moved is changed, a driving force is generated in the double stance by adjusted the torque of the drive device to virtually move the foot ends of the both lower limbs by a predetermined stable distance in an opposite direction to a walking direction.

13 Claims, 9 Drawing Sheets

WALKING CONTROL SYSTEM AND CONTROL METHOD OF ROBOT

CROSS REFERENCE TO RELATED APPLICATION

The present application claims priority to Korean Patent Application No. 10-2019-0017531, filed Feb. 15, 2019, the entire contents of which is incorporated herein for all purposes by this reference.

BACKGROUND

Field of the Invention

The present invention relates generally to a walking control system and a control method of a robot, and more particularly, to a walking control technology of a bipedal walking robot or a lower limb wearable robot.

Description of the Related Art

A robot is a device that operates to mimic human behavior. In the early stage of robot development, industrial robots, such as production robots, were developed to perform human tasks. In recent years, research on a bipedal walking robot having the same shape as that of a human has been increasing, and wearable robots capable of being worn by humans have been developed. In particular, the bipedal walking robot is more unstable than the three or more legged robots, so walking control thereof is relatively complex and difficult.

However, the bipedal walking robot has advantage of being able to walk on obstacles while flexibly responding to obstacles such as stairs. In walking control of a bipedal walking robot or a lower limb wearable robot, a leading leg and a trailing leg cross each other. However, in the conventional walking control, the driving force is insufficient since there is no control strategy when the two legs are in contact with the ground simultaneously (double stance).

The foregoing is intended merely to aid in the understanding of the background of the present invention, and is not intended to mean that the present invention falls within the purview of the related art that is already known to those skilled in the art.

SUMMARY

Accordingly, the present invention provides a technique for operating a plurality of links in a state in which the ends of both lower limbs are in contact with the ground simultaneously (double stance) during a walking control.

In order to achieve the above object, according to some aspect of the present invention, a walking control system of a robot may include: a link device having a plurality of links that correspond to both lower limbs; a drive device configured to provide torque to the link device to rotate the plurality of links; and a walking controller configured to implement walking of the robot by operating the drive device to move both lower limbs alternately. In a double stance state where foot ends of the both lower limbs are simultaneously in contact with ground during walking, the torque of the drive device is adjusted to virtually move the foot ends of the both lower limbs by a predetermined stable distance in an opposite direction to a walking direction, thereby generating a driving force in the double stance state.

As the walking controller adjusts the torque of the drive device to virtually move the foot ends of the both lower limbs by the predetermined stable distance in the opposite direction to the walking direction, each of the plurality of links is rotated with the foot ends of the both lower limbs simultaneously fixed on the ground, and the link device may be propelled in the walking direction. The link device may include the plurality of links that correspond to both calves, both thighs, and both pelves, respectively; and the drive device may be configured to provide torque to rotate each of the links at positions of knee joints between links corresponding to the calves and the thighs, and hip joints between links corresponding to the thighs and the pelves.

The link device may include the plurality of links that correspond to both calves, both thighs, and both pelves, respectively; and the control system may further include a torso device to which links corresponding to a left pelvis and a right pelvis of the link device are coupled, whereby each of the both lower limbs coupled to the torso device has three degrees of freedom. The drive device may be configured to provide torque to rotate each of the links at positions of knee joints between links corresponding to the calves and the thighs, hip joints between links corresponding to the thighs and the pelves, and trunk joints between links corresponding to the pelves and the torso device. In the walking controller, the stable distance may be set such that a ratio of a sum of the stable distances at the foot ends of the both lower limbs to the step length is about 0.1 or greater and about 0.4 or less.

In order to achieve the above object, according to some aspect of the present invention, a walking control method of a robot may include: receiving a walking command of the robot including a link device having a plurality of links that correspond to both lower limbs; in response to receiving the walking command, implementing walking of the robot by providing torque to the link device to move a first lower limb; and in a double stance state where foot ends of the both lower limbs are simultaneously in contact with ground while the lower limb to be moved is changed, generating a driving force in the double stance by adjusting the torque of the drive device to virtually move the foot ends of the both lower limbs by a predetermined stable distance in an opposite direction to a walking direction.

In implementing the walking of the robot, the first lower limb to be operated to be moved may be selected based on loads measured at the foot ends of both lower limbs. In the generating of the driving force in the double stance, when the torque is provided to the link device, each link included in the both lower limbs may be rotated with the foot ends of the both lower limbs simultaneously fixed on the ground, and the link device may be propelled in the walking direction.

In the generating of the driving force in the double stance, the stable distance may be set such that a ratio of a sum of the stable distances at the foot ends of the both lower limbs to the step length is about 0.1 or greater and about 0.4 or less. In the generating of the driving force in the double stance, the foot ends of the both lower limbs may be moved by the predetermined stable distance such that positions of multiple control points controlling the foot ends of the both lower limbs are connected into a Bezier curve.

The link device may include a plurality of links that correspond to both calves, both thighs, and both pelves, respectively; and in the generating of the driving force in the double stance, the torque may be adjusted to rotate each of the links at positions of knee joints between links corresponding to the calves and the thighs, and hip joints between links corresponding to the thighs and the pelves.

The control method may further include: after generating the driving force in the double stance, implementing walking of the robot by alternately moving the both lower limbs by providing torque to the link device to move a second lower limb. According to a walking control system and a control method of a robot of the present invention, as driving force is generated in the state where the two legs are in contact with the ground simultaneously (double stance), it may be possible to improve walking efficiency and stability. Additionally, as the stability may be improved, movement of the upper body of the robot or the upper body of the wearer to balance may be minimized.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
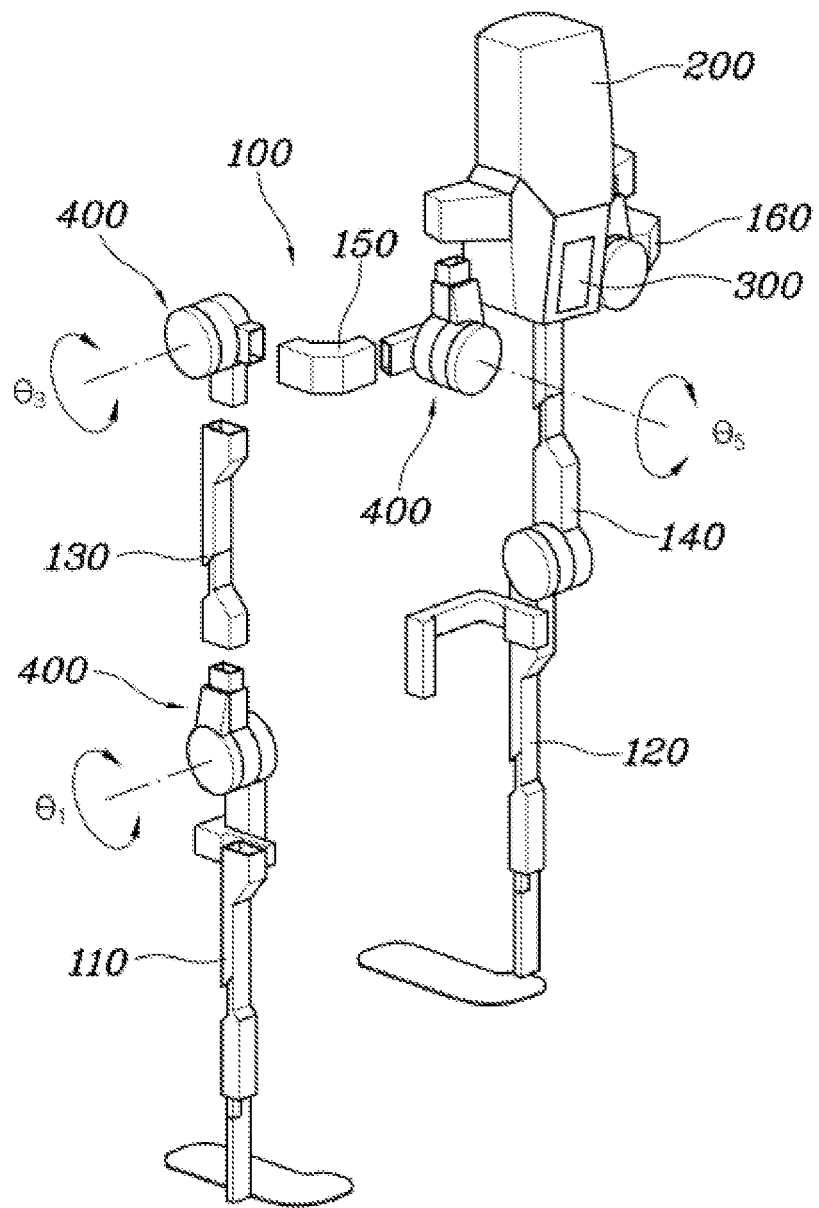
FIG. 1 shows a walking control system of a robot according to an exemplary embodiment of the present invention.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", "include", "have", etc., when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following description, the structural or functional description specified to exemplary embodiments according to the concept of the present invention is intended to describe the exemplary embodiments, so it should be understood that the present invention may be variously embodied, without being limited to the exemplary embodiments.

The exemplary embodiments according to the concept of the present invention may be variously modified and may have various shapes, so examples of which are illustrated in the accompanying drawings and will be described in detail with reference to the accompanying drawings. However, it should be understood that the exemplary embodiments according to the concept of the present invention are not limited to the embodiments which will be described hereinbelow with reference to the accompanying drawings, but various modifications, equivalents, additions and substitutions are possible, without departing from the scope and spirit of the invention.

It will be understood that, although the terms first, second, etc. may be used herein to describe various elements, these elements should not be limited by these terms. These terms are only used to distinguish one element, from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Further, the terms used herein to describe a relationship between elements, for example, "between", "directly between", "adjacent" or "directly adjacent" should be interpreted in the same manner as those described above.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, an exemplary embodiment of the present invention will be described in detail with reference to the accompanying drawings. Throughout the drawings, the same reference numerals will refer to the same or like parts.

FIG. 1 shows a walking control system of a robot according to an exemplary embodiment of the present invention. With reference to FIG. 1, the robot of the present invention is a bipedal walking robot including both lower limbs, and may be a robot or a lower limb wearable robot that is separately configured to be bipedal.

The lower limb wearable robot is a robot that assists lower limb strength by being worn by patients or people who lack lower limb strength, and may include a link device 100 having a plurality of links that correspond to both lower limbs of a wearer. The lower limb wearable robot may work or operate together with a crutch (not shown) for supporting the wearer through the upper body of the wearer, and the crutch (not shown) may include a controller (not shown) operated by the wearer to control the operation of the lower limb wearable robot.

The controller (not shown) or the walking controller 300 according to an exemplary embodiment of the present disclosure may be implemented through a non-transitory memory (not shown) configured to store data with respect to algorithms configured to execute operations of various components in the vehicle or software instructions reproducing the algorithms, and a processor (not shown) programmed to perform the operations described hereinafter by using the data stored in the memory. Herein, the memory and the processor may be implemented as separate chips. Alternatively, the memory and the processor may be implemented as a single chip integrated with each other. The processor may take the form of one or more processor(s).

A walking control system of a robot according to an exemplary embodiment of the present invention may include: a link device 100 having a plurality of links that correspond to both lower limbs; a drive device 400 configured to provide torque to the link device 100 to rotate the plurality of links; and a walking controller 300 configured to implement walking of the robot by operating the drive device 400 to move both lower limbs alternately. In a double stance state where foot ends of the both lower limbs are simultaneously in contact with the ground during walking, the torque of the drive device 400 may be adjusted to virtually move the foot ends of the both lower limbs by a predetermined stable distance Lds in an opposite direction to a walking direction, thereby generating a driving force in the double stance state.

The link device 100 may include a plurality of links that correspond to right and left lower limbs. In particular, as shown in FIG. 1, the link device 100 may include a plurality of links that correspond to both calves, both thighs, and both pelves, respectively. In other words, the link device 100 may include a left calf link 110, a right calf link 120, a left thigh link 130 coupled to the left calf link 110, a right thigh link 140 coupled to the right calf link 120, a left pelvis link 150 coupled to the left thigh link 130, and a right pelvis link 160 coupled to the right thigh link 140. The drive device 400 may be configured to rotate the plurality of links by providing torque to the link device 100. Particularly, the drive device may be configured to provide torque to rotate the plurality of links with respect to each other at joints where the plurality of links included in the link device 100 are coupled to each other.

As an exemplary embodiment, the drive device 400 may be configured to provide torque to rotate each of the links at positions of knee joints between links corresponding to the calves 110 and 120, and the thighs 130 and 140, and hip joints between links corresponding to the thighs 130 and 140, and the pelves 150 and 160. The drive device 400 may include motors that provide torque to each joint to rotate the associated links at each joint.

In other words, the drive device 400 may be configured to provide torque to rotate the calf links 110 and 120 and the thigh links 130 and 140 with respect to each other at the knee joints where the calf links and the thigh links are coupled together, and to rotate the thigh links 130 and 140 and the pelvis links 150 and 160 with respect to each other at the hip joints where the thigh links 130 and 140 and the pelvis links 150 and 160 are coupled together. In particular, the knee and hip joints may rotate links with respect to each other from the left side of the wearer (e.g., user) to the right side in a direction parallel to the direction through the wearer.

In addition, the control system may further include a left support link (not shown) coupled to the left calf link 110 to support the bottom, and a right support link (not shown) coupled to the right calf link 120 to support the bottom. Additionally, ankle joints (not shown), where the calf links 110 and 120 and the support links (not shown) are coupled, may be a passive type and may not be provided with torque by separate power.

Further, the control system may further include a torso device 200 to which links corresponding to the left pelvis 150 and the right pelvis 160 of the link device 100 may be coupled, whereby each of the both lower limbs coupled to the torso device 200 has three degrees of freedom. In other words, the control system may further include the torso device 200 corresponding to the torso of the wearer, to which the both lower limbs of the link device 100 may be coupled simultaneously. The torso device 200 may be disposed between the both lower limbs, and may be coupled between the left pelvis link 150 and the right pelvis link 160.

The drive device 400 may be configured to provide torque to rotate each of the links at the knee joints (not shown) between links corresponding to the calves 110 and 120 and the thighs 130 and 140, hip joints between links corresponding to the thighs 130 and 140 and the pelves 150 and 160, and trunk joints between the links 150 and 160 corresponding to the pelves and the torso device 200. In other words, the drive device 400 may be configured to provide torque such that the left pelvis link 150 or the right pelvis link 160, and the torso device 200 are rotated with respect to each other at the trunk joint between the left pelvis link 150 or the right pelvis link 160, and the torso device 200. In particular, at the trunk joint, the links may be rotated relatively around the rotational axis in the direction parallel to the front and back direction of the wearer.

Figure 2:
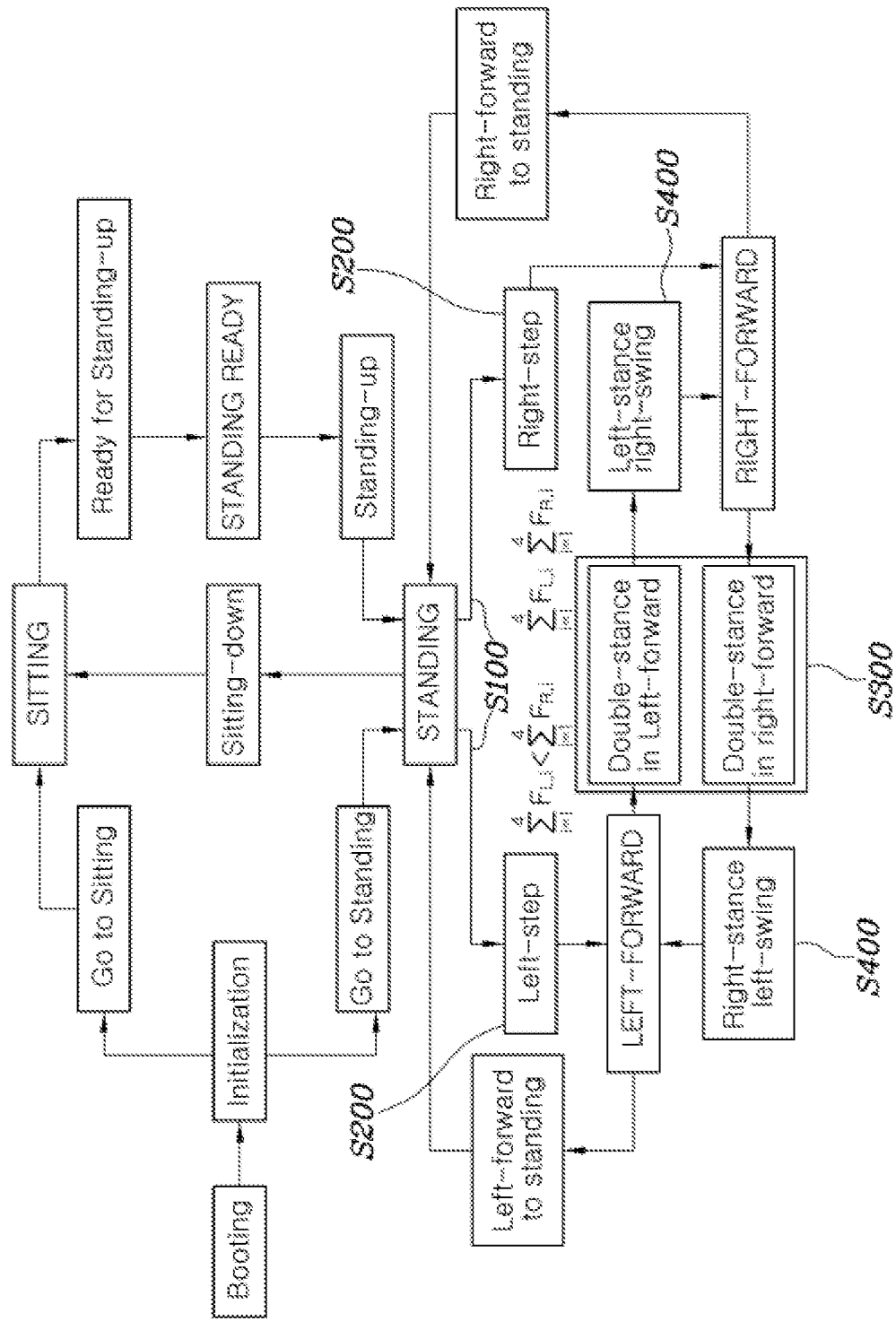
FIG. 2 shows control logic of a finite-state machine according to an exemplary embodiment of the present invention.
Figure 3:
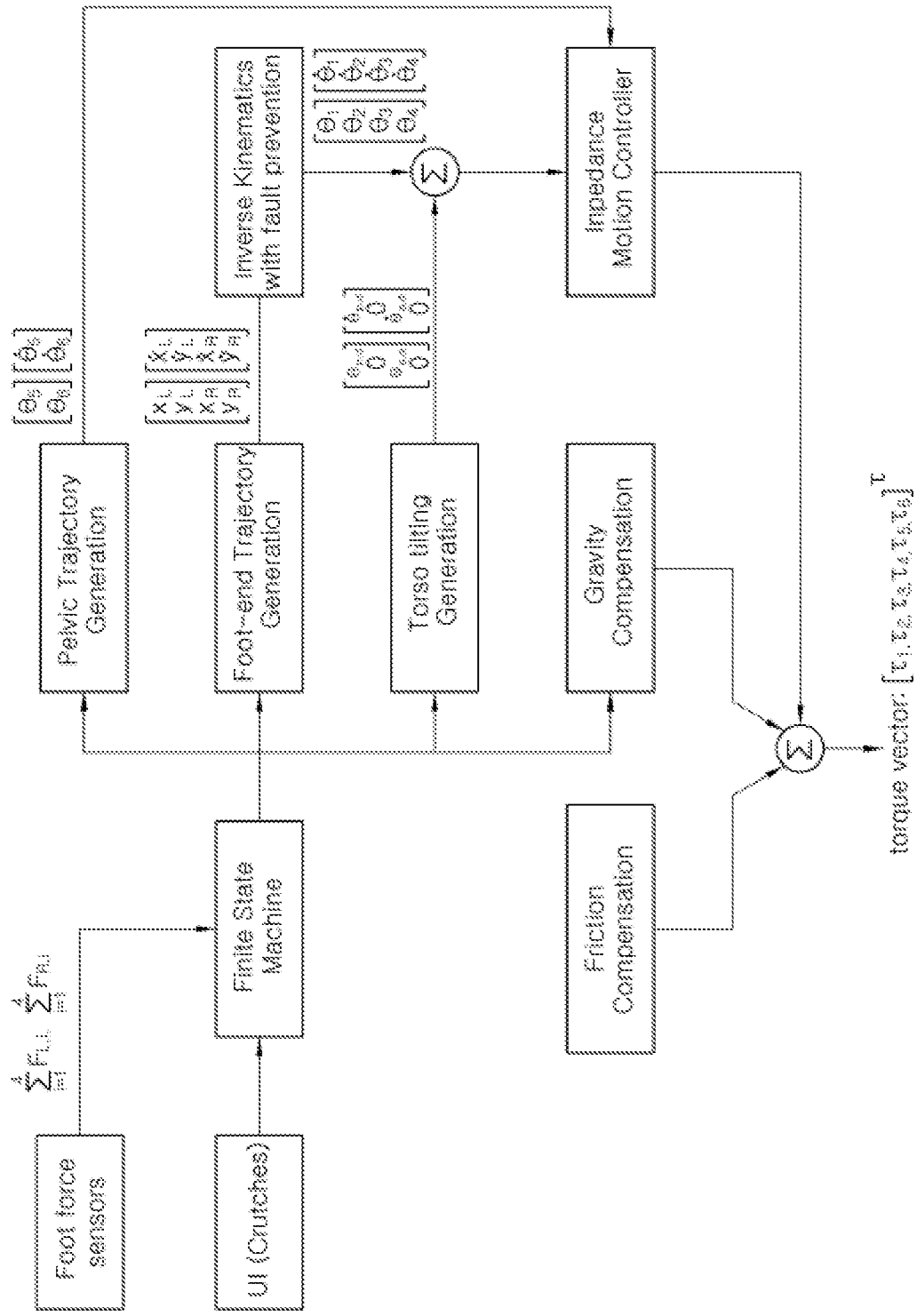
FIG. 3 shows a flowchart of a walking control of a robot according to an exemplary embodiment of the present invention.

FIG. 2 shows control logic of a finite-state machine according to an exemplary embodiment of the present invention; and FIG. 3 shows a flowchart of a walking control of a robot according to an exemplary embodiment of the present invention. With further reference to FIGS. 2 to 3, the walking control system of a robot or the walking control method of a robot according to an exemplary embodiment of the present invention may include control logic of a finite-state machine.

In particular, through the operation of the wearer, it may be possible to execute a sitting position from the standing position or the standing position from the sitting position, or to control the walking from the standing position. In particular, the walking controller 300 may implement walking of the robot by operating the drive device 400 to move both lower limbs alternately. When the controller is operated to allow the wearer to walk in the standing position, the walking controller 300 may swing one of the both lower limbs in the walking direction. When continuing to walk, the walking controller 300 may be configured to operate the drive device 400 to alternately swing the both lower limbs.

Further, the walking controller 300 may be configured to adjust the torque of the drive device 400 to virtually move the foot ends of the both lower limbs by the predetermined stable distance Lds in the opposite direction to the walking direction when the foot ends of the both lower limbs are simultaneously fixed on the ground while walking, thereby generating a driving force in the double stance state. The double stance state where the foot ends of the both lower limbs are simultaneously fixed on the ground while walking is a state between the alternating movements of the left lower limb and the right lower limb, and may refer to a state between swinging one of the both lower limbs and changing the lower limb.

In other words, when the foot ends of the both lower limbs are simultaneously fixed on the ground between the alternating swings of the both lower limbs, the walking controller 300 may be configured to adjust the torque of the drive device 400 to virtually move the foot ends of the both lower limbs by the predetermined stable distance Lds in the opposite direction to the walking direction. Thus, when the both lower limbs are in contact with the ground (double stance), by applying the control that generates the driving force of the robot, it may be possible to improve the efficiency and stability of walking.

With reference to FIG. 3, the torque of the drive device 400 may be adjusted by impedance control. As the foot-end trajectory of the both lower limbs is generated, the control positions ($x_L, y_L$, $x_R, y_R$) and the control speeds ($x'_L, y'_L, x'_R, y'_R$) of the ends of the both lower limbs may be determined, and the angles ($\theta_1, \theta_2, \theta_3, \theta_4$) and the angular velocities ($\theta'_1, \theta'_2, \theta'_3, \theta'_4$) of the links at the knee joints and hip joints for stable walking may be determined to prevent falling.

Further, for stable walking control, the torso tilting angle ($\theta_p$) may be determined, and the angles($\theta_5, \theta_6$) and the angular velocities ($\theta'_5, \theta'_6$) of the trunk joints may be determined. By combining these, the torque ($\tau_1, \tau_2, \tau_3, \tau_4, \tau_5, \tau_6$) of the drive device 400 may be generated at each joint through impedance control. In addition, torque of the drive device 400 may be calculated additionally considering compensation based on friction force and gravity.

Figure 4:
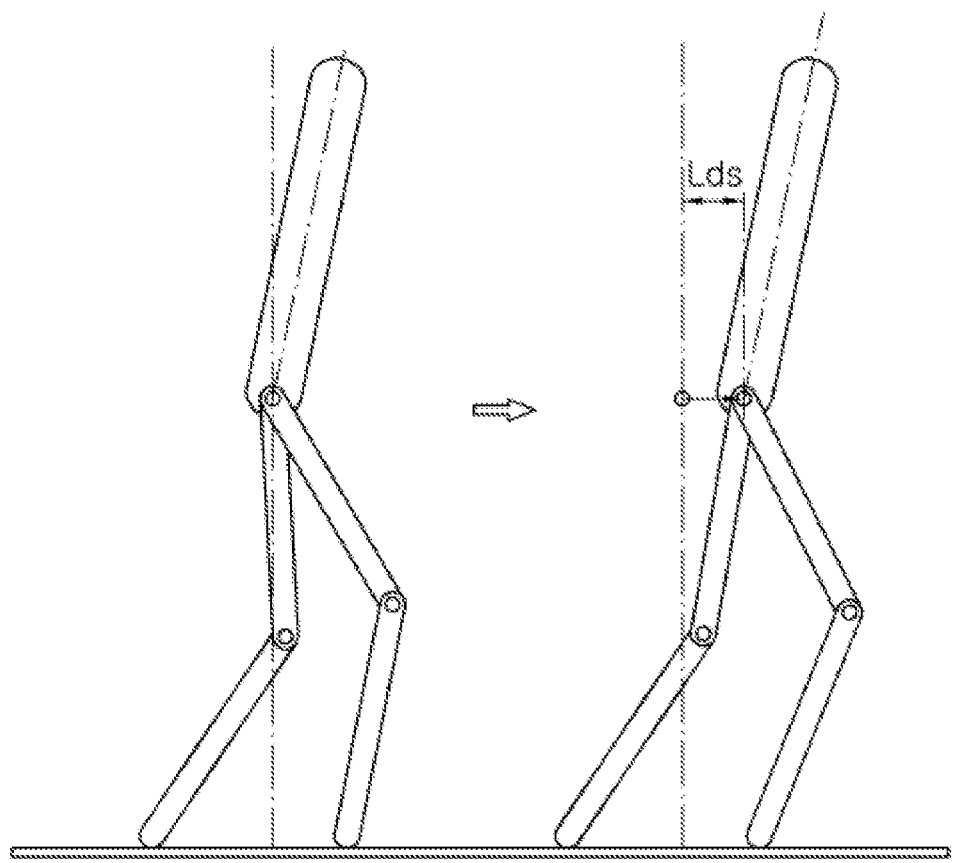
FIG. 4 shows the movement of the robot in a ground coordinate system according to an exemplary embodiment of the present invention.

FIG. 4 shows the movement of the robot in a ground coordinate system according to an exemplary embodiment of the present invention. Herein, the ground coordinate system is a coordinate system centered on a fixed ground plane, and the robot moves around a ground coordinate system. The walking controller 300 may be configured to operate the foot ends of the both lower limbs to be moved by the predetermined stable distance Lds and the robot may be configured to move in the walking direction with the foot ends fixed on the ground.

With further reference to FIG. 4, as the walking controller 300 may be configured to adjust the torque of the drive device 400 to virtually move the foot ends of the both lower limbs by the predetermined stable distance Lds, each link may be rotated with the foot ends of the both lower limbs simultaneously fixed on the ground, whereby the link device 100 may be propelled in the walking direction. The walking controller 300 may be disposed at the torso device 200 and may be configured to adjust the rotation of the both lower limbs based on the torso device 200. In other words, the walking controller 300 may be configured to adjust the torque of the drive device 400 to virtually move the foot ends of the both lower limbs by the predetermined stable distance Lds based on the torso device 200.

Accordingly, although the walking controller 300 may be configured to operate the drive device 400 to virtually move the foot ends of the both lower limbs by the predetermined stable distance Lds in the opposite direction to the walking direction, in fact, with the foot ends of the both lower limbs fixed on the ground, the grounded bilateral foot ends are fixed on the ground, the link device 100 may be rotated to move the torso device 200.

Figure 5:
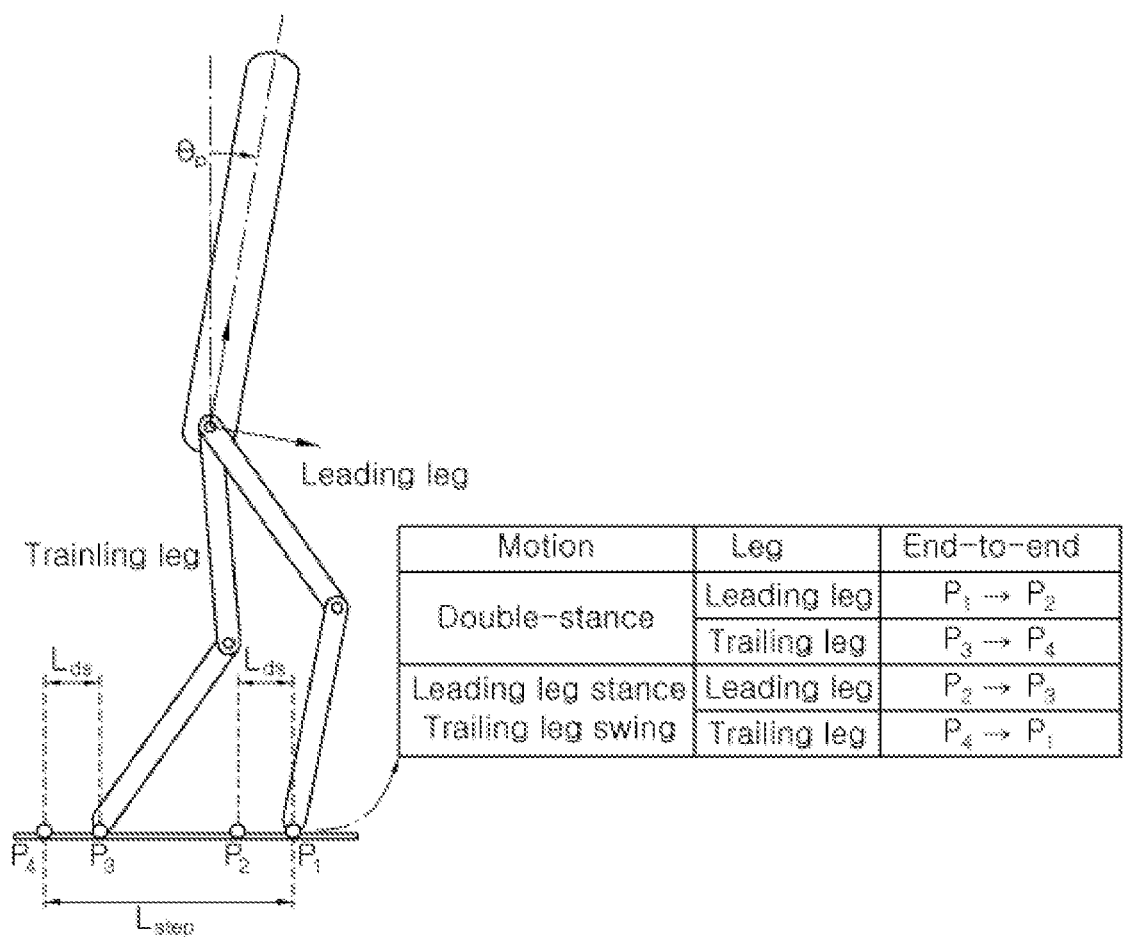
FIG. 5 shows the walking control of a robot in a robot coordinate system according to an exemplary embodiment of the present invention.

FIG. 5 shows the walking control of a robot in a robot coordinate system according to an exemplary embodiment of the present invention. Herein, the robot coordinate system is a coordinate system coordinate system centered on the both lower limbs of the robot. With further reference to FIG. 5, the swing control and the double stance control may operate the drive device 400 to move the foot ends of both lower limbs of the robot in the opposite direction to the walking direction based on the robot coordinate system, and in the ground coordinate system, the robot coordinate system may be moved in the walking direction with the foot ends of the both lower limbs of the robot fixed on the ground.

The walking of the robot controls the both lower limbs to be moved alternately (swing control), and when the foot ends of the both lower limbs are simultaneously in contact with the ground between the swing, the walking of the robot controls the foot ends of the both lower limbs to be moved in the opposite direction to the walking direction (double stance control). In particular, in the swing control, of both lower limbs, the trailing leg may be swung forward to move forward more than the leading leg with the leading leg fixed on the ground in the walking direction, thereby implementing walking. When only the swing control is performed, the leading leg may be moved from P1 to P3, the trailing leg may be moved from P3 to P1, and the step length may be a distance between P1 and P3.

The exemplary embodiment of the present invention may include the double stance control between the swing controls, and in the double stance control, the drive device 400 may be operated to move the foot ends of the both lower limbs by the predetermined stable distance Lds in the opposite direction to the walking direction. Therefore, the link device 100 may be moved in the walking direction based on the fixed foot ends of the both lower limbs. In other words, before the swing control, the double stance control, where the leading leg is moved from P1 to P2 and the trailing leg is moved from P3 to P4, may be included. In particular, the step length Lstep may be a distance between P1 and P4.

Thus, the motion of the upper body may be reduced in a single stance state according to any one swing motion of the lower limbs, whereby stability in the unstable single stance state may be improved, and thus the overall walking stability may be improved. The predetermined stable distance Lds according to an exemplary embodiment of the present invention may be preset to have a predetermined ratio to the step length Lstep of the robot.

Figure 6:
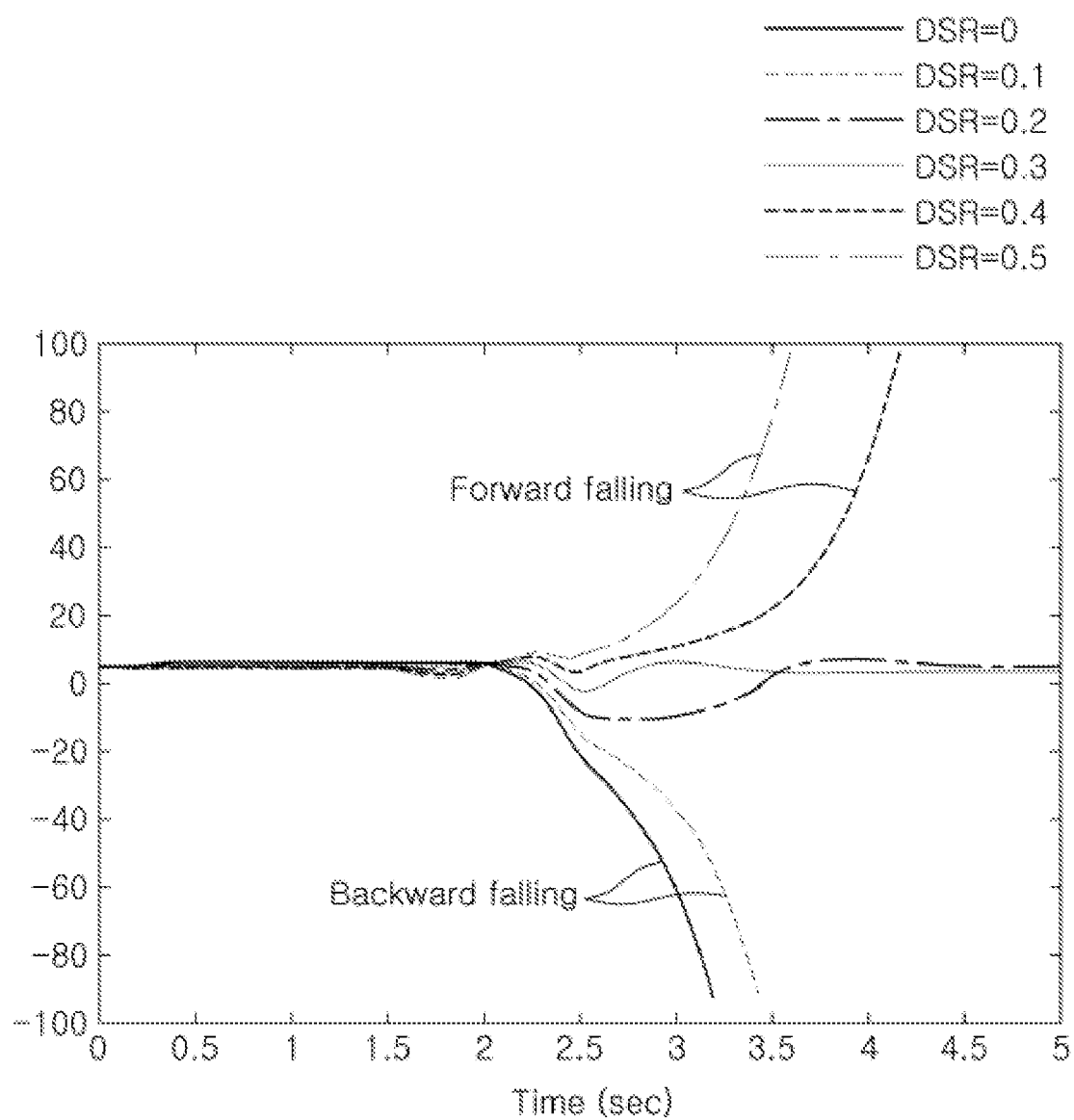
FIG. 6 shows change in the angle of the upper body according to a double stance ratio according to an exemplary embodiment of the present invention.

FIG. 6 shows change in the angle of the upper body according to a double stance ratio according to an exemplary embodiment of the present invention. With further reference to FIG. 6, the double stance ratio may be calculated as follows, and thus the change in the angle of the upper body according to walking of the robot may be as shown in FIG. 6.

$$DSR = \frac{2L_{ds}}{L_{step}}$$

wherein, Lds is the stable distance, and Lstep is the step length. In the walking controller 300, the stable distance Lds may be set such that a ratio of a sum of the stable distances Lds at the foot ends of the both lower limbs to the step length Lstep is 0.1 or greater and 0.4 or less.

As shown in FIG. 6, if DSR=0 (not including double stance control) or DSR=0.1, it is highly likely that the robot tilts and falls in a direction opposite to the walking direction (backward falling). Further, if DSR=0.4 or DSR=0.5, it is highly likely that the robot tilts and falls in the walking direction (forward falling). Accordingly, the walking controller 300 may be configured to preset the stable distance Lds in which the double stance ratio (DSR) is 0.1 or greater and 0.4 or less. More preferably, the stable distance Lds may be preset such that the double stance ratio (DSR) is 0.2 or greater and 0.3 or less.

Figure 7:
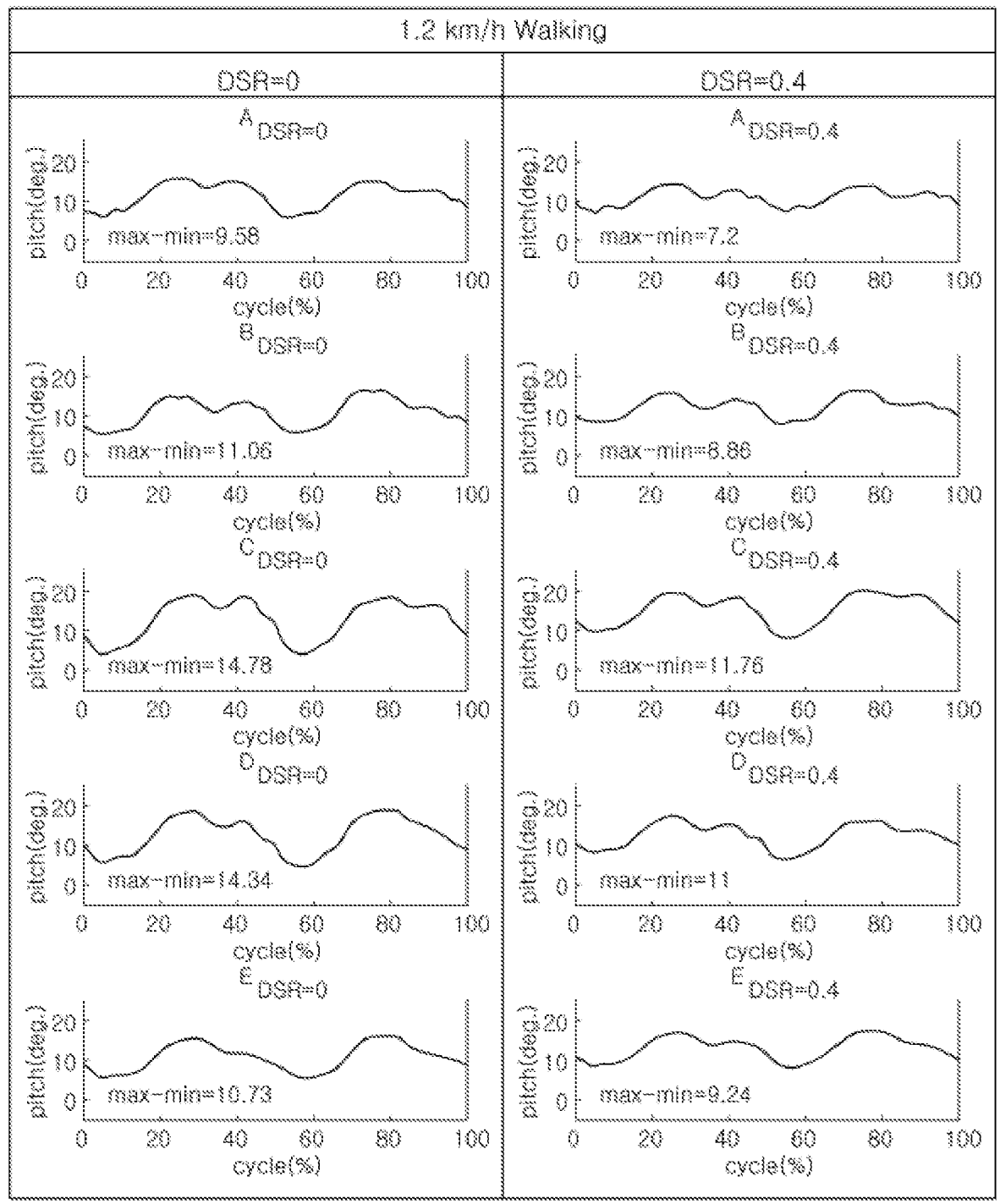
FIG. 7 shows change in the angle of the upper body according to double stance control according to an exemplary embodiment of the present invention.

FIG. 7 shows change in the angle of the upper body according to double stance control according to an exemplary embodiment of the present invention. With further reference to FIG. 7, the left side shows the change in the angle of the upper body at the time of walking when the walking control is performed so that the double stance control is not included (DSR=0), and the right side shows the change in the angle of the upper body at the time of walking when the double stance control is included (DSR=0.4).

Compared to each other, the robot may realize a stable walking in the walking of the robot through the action of bending or straightening the upper body. The change in the angle of the upper body of the robot shown in the left and right sides of the drawing shows that the change in the angle of the upper body of the robot is reduced when the double stance control is included. Even if the specific numerical values are compared, the difference between the maximum value and the minimum value of the upper body angle of the robot is reduced in all exemplary embodiments. In other words, as a result of including the double stance control, walking stability of the robot may be improved and the movement of the upper body of the robot may be reduced.

With further reference to FIG. 2, a walking control method of a robot according to an exemplary embodiment of the present invention may include: receiving a walking command of the robot including the link device 100 having a plurality of links that correspond to both lower limbs (S100); in response to receiving the walking command, implementing walking of the robot by providing torque to the link device 100 to move a first lower limb (S200); and in a double stance state where foot ends of the both lower limbs are simultaneously in contact with ground while the lower limb to be moved is changed, generating a driving force in the double stance by adjusting the torque of the drive device to virtually move the foot ends of the both lower limbs by a predetermined stable distance in an opposite direction to a walking direction (S300).

In the receiving of a walking command of the robot (S100), walking command may be received from the wearer through a controller disposed in a separate crutch. In particular, in the sitting position, the position may be converted into the standing position by the command input through the controller, and the robot may be additionally operated to walk by the command input through the controller in the standing position. In the implementing of walking of the robot (S200), torque may be provided to the link device 100 to move one of the both lower limbs in the walking direction. In particular, one of the both lower limbs may be operated to be swung in the walking direction with the other lower limb fixed on the ground.

In particular, in the implementing of walking of the robot (S200), the first lower limb to be moved may be selected based on loads measured at the foot ends of both lower limbs. Additionally, a foot force sensor for measuring loads at each foot end of the both lower limbs of the robot, and a plurality of foot force sensors may be provided at each foot end and the sum of the foot force sensors may be calculated as the load of each lower limb. By comparing the load of the left lower limb with that of the right lower limb, a lower limb with a lower load may be selected and moved to the walking direction. On the contrary, a lower limb with a higher load may be fixed on the ground.

In the generating of the driving force in the double stance (S300), when the first lower limb is moved through the swing control and the landing is completed, the double stance control may be performed while the foot ends of both lower limbs are simultaneously in contact with the ground while the lower limb being moved is changed. In the double stance control, it may be possible to virtually move the foot ends of the both lower limbs by the predetermined stable distance Lds in the opposite direction to the walking direction.

In particular, in the generating of the driving force in the double stance (S300), when the torque is provided to the link device 100, each link included in the both lower limbs may be rotated with the foot ends of the both lower limbs simultaneously fixed on the ground, and the link device may be propelled in the walking direction. In other words, although the foot ends of the both lower limbs are moved around the walking controller 300 positioned in the torso device 200, in fact, with the foot ends of the both lower limbs fixed on the ground, each link included in the both lower limbs may be rotated to propel the torso device 200 in the walking direction. In the generating of the driving force in the double stance (S300), the stable distance Lds may be set such that a ratio of a sum of the stable distances Lds at the foot ends of the both lower limbs to the step length Lstep is 0.1 or greater and 0.4 or less.

Figure 8A:
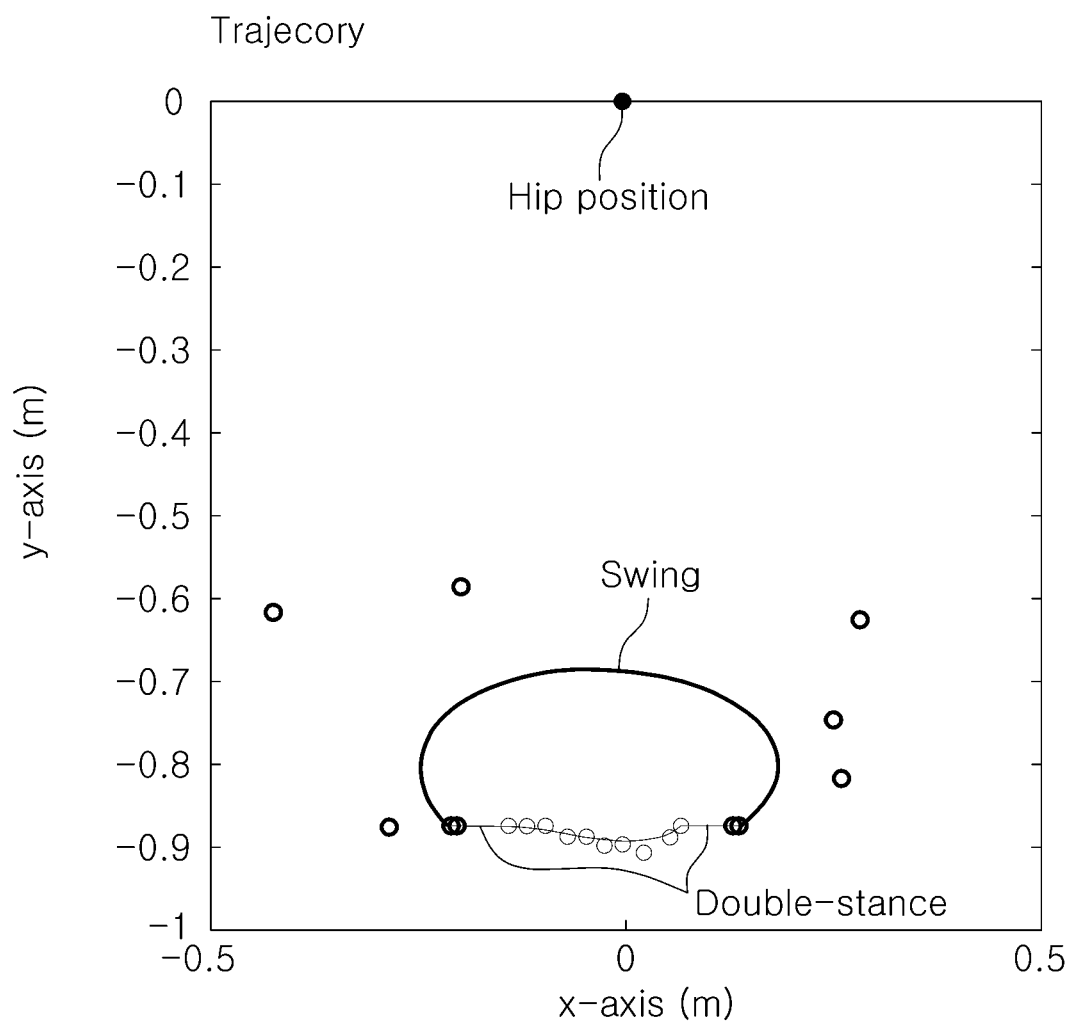
FIGS. 8A-8B show a walking control trajectory of the robot according to an exemplary embodiment of the present invention.
Figure 8B:
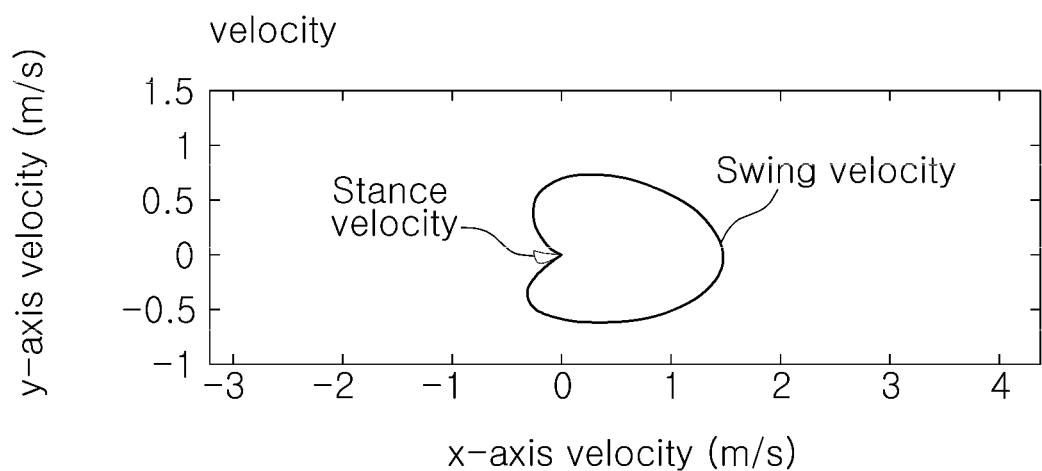

FIG. 8 shows a walking control trajectory of the robot according to an exemplary embodiment of the present invention. With reference to FIG. 8, in the generating of the driving force in the double stance (S300), the trajectory where the foot ends of the both lower limbs are moved by the predetermined stable distance Lds may be determined such that positions of multiple control points controlling the foot ends of the both lower limbs are connected into a Bezier curve.

In particular, as shown in the drawing, which shows a trajectory that controls the foot ends of both lower limbs by locating the torso device 200 as a fixed point, wherein it is shown that a Bezier curve connecting twelve points at a uniform interval between the start point and the end point of the trajectory. This makes it possible to perform a linking motion where the foot ends of both lower limbs are naturally connected.

The link device 100 may include a plurality of links that correspond to both calves, both thighs, and both pelves, respectively; and in the generating of the driving force in the double stance (S300), the torque may be adjusted to rotate each of the links at positions of knee joints between links corresponding to the calves and the thighs, and hip joints between links corresponding to the thighs and the pelves. After generating the driving force in the double stance (S300), the control method may further include implementing walking of the robot by alternately moving the both lower limbs by providing torque to the link device 100 to move the second lower limb (S400).

In the implementing of walking of the robot by alternately moving the both lower limbs (S400), it may be possible to implement walking by swing control of the second lower limb that is the opposite limb of the first lower limb previously swung. Particularly, in the implementing of walking of the robot by alternately moving the both lower limbs (S400), it may be possible to alternately move the both lower limbs by a distance corresponding to the step length Lstep, and in the generating of the driving force in the double stance (S300), it may be possible to move the first lower limb by a distance less than the step length Lstep.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A walking control system of a robot, comprising:
a link device having a plurality of links that correspond to both lower limbs;
a drive device configured to provide torque to the link device to rotate the plurality of links; and
a walking controller configured to implement walking of the robot by operating the drive device to move both lower limbs alternately,
wherein in a double stance state where foot ends of the both lower limbs are simultaneously in contact with ground during walking, the walking controller is configured to adjust the torque of the drive device to virtually move the foot ends of the both lower limbs by a predetermined stable distance in an opposite direction to a walking direction to generate a driving force in the double stance state.

2. The control system of claim 1, wherein as the walking controller is configured to adjust the torque of the drive device to virtually move the foot ends of the both lower limbs by the predetermined stable distance in the opposite direction to the walking direction, each of the plurality of links is rotated with the foot ends of the both lower limbs simultaneously fixed on the ground, and the link device is propelled in the walking direction.

3. The control system of claim 1, wherein the link device includes the plurality of links corresponding to both calves, both thighs, and both pelves, respectively and the drive device is configured to provide torque to rotate each of the links at positions of knee joints between links corresponding to the calves and the thighs, and hip joints between links corresponding to the thighs and the pelves.

4. The control system of claim 1, wherein the link device includes the plurality of links that correspond to both calves, both thighs, and both pelves, respectively and the control system further includes a torso device to which links corresponding to a left pelvis and a right pelvis of the link device are coupled and each of the both lower limbs coupled to the torso device has three degrees of freedom.

5. The control system of claim 4, wherein the drive device is configured to provide torque to rotate each of the links at positions of knee joints between links corresponding to the calves and the thighs, hip joints between links corresponding to the thighs and the pelves, and trunk joints between links corresponding to the pelves and the torso device.

6. The control system of claim 1, wherein in the walking controller, the stable distance is set such that a ratio of a sum of the stable distances at the foot ends of the both lower limbs to the step length is 0.1 or greater and 0.4 or less.

7. A walking control method of a robot, comprising:
receiving, by a walking controller, a walking command of the robot including a link device having a plurality of links that correspond to both lower limbs;
in response to receiving of the walking command, implementing, by the walking controller, walking of the robot by providing torque to the link device to move a first lower limb; and
in a double stance state where foot ends of the both lower limbs are simultaneously in contact with ground while the lower limb to be moved is changed, generating, by the walking controller, a driving force in the double stance by adjusting the torque of the drive device to virtually move the foot ends of the both lower limbs by a predetermined stable distance in an opposite direction to a walking direction.

8. The control method of claim 7, wherein in the implementing of walking of the robot, the first lower limb to be moved is selected based on loads measured at the foot ends of both lower limbs.

9. The control method of claim 7, wherein in the generating of the driving force in the double stance, when the torque is provided to the link device, each link included in the both lower limbs is rotated with the foot ends of the both lower limbs simultaneously fixed on the ground, and the link device is propelled in the walking direction.

10. The control method of claim 7, wherein in the generating of the driving force in the double stance, the stable distance is set such that a ratio of a sum of the stable distances at the foot ends of the both lower limbs to the step length is 0.1 or greater and 0.4 or less.

11. The control method of claim 7, wherein in the generating of the driving force in the double stance, the foot ends of the both lower limbs are moved by the predetermined stable distance to connect positions of multiple control points controlling the foot ends of the both lower limbs into a Bezier curve.

12. The control method of claim 7, wherein the link device includes a plurality of links that correspond to both calves, both thighs, and both pelves, respectively and in the generating of the driving force in the double stance, the torque is adjusted to rotate each of the links at positions of knee joints between links corresponding to the calves and the thighs, and hip joints between links corresponding to the thighs and the pelves.

13. The control method of claim 7, further comprising:
after generating the driving force in the double stance, implementing, by the walking controller, walking of the robot by alternately moving the both lower limbs by providing torque to the link device to move a second lower limb.

* * * * *